Patented Dec. 17, 1929

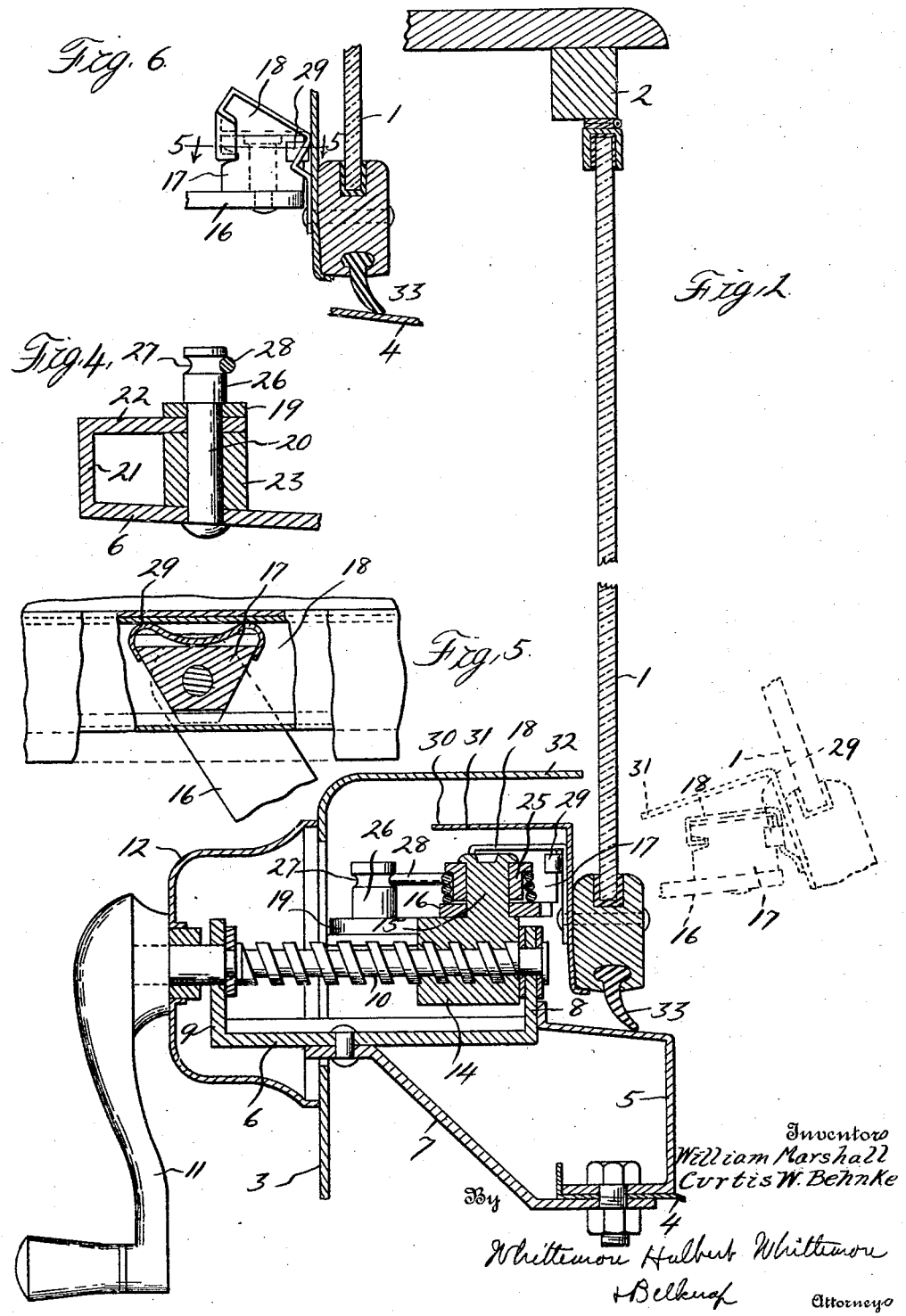

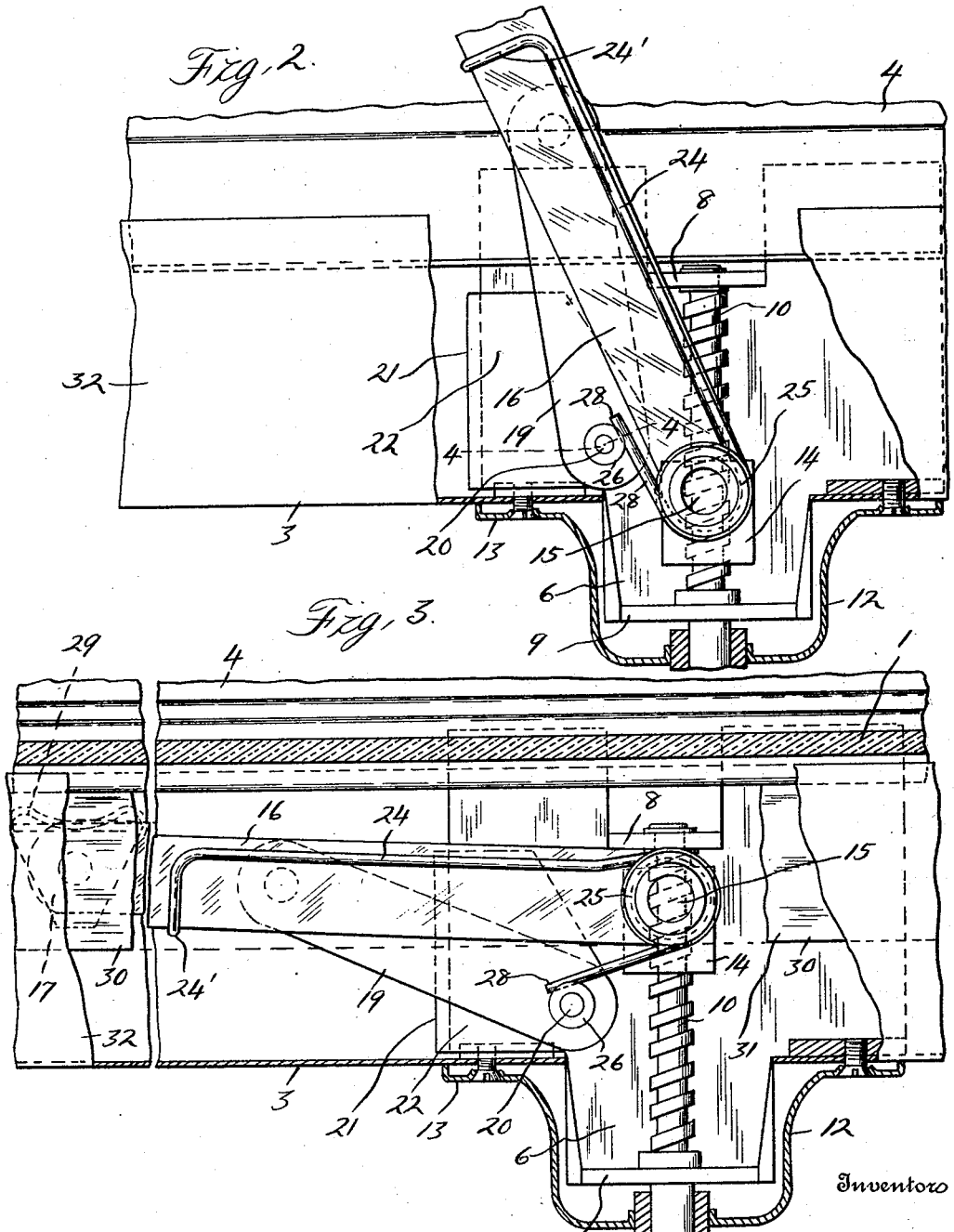

1,739,726

UNITED STATES PATENT OFFICE

WILLIAM MARSHALL AND CURTIS W. BEHNKE, OF DETROIT, MICHIGAN, ASSIGNORS TO BRIGGS MANUFACTURING COMPANY, OF DETROIT, MICHIGAN, A CORPORATION OF MICHIGAN

WINDSHIELD REGULATOR MECHANISM

Application filed June 20, 1927. Serial No. 200,090.

This invention relates to windshields and more particularly to improvements in the operating mechanism and mounting therefor.

The invention has among its objects the production of a simple, compact, and readily operable means for adjusting the windshield, and has also as one of its principal objects to provide a mechanism of this character which is self-locking and involves a unitary control. Another predominant feature resides in the mounting of the control adjacent the lower edge of the windshield whereby the same may be readily and conveniently operated.

The invention further contemplates the provision of a ventilator so positioned with respect to the windshield that an adjustment of the latter results in an automatic control of the ventilator.

The above and other objects, advantages and novel details of construction of the present invention will be made more apparent as this description proceeds, especially when considered in connection with the accompanying drawings wherein:

Figure 1 is a vertical sectional view through the windshield operating mechanism constructed in accordance with my invention;

Figure 2 is a fragmentary plan view partly in section showing the position of the operating mechanism when the windshield is in the open position;

Figure 3 is a view similar to Figure 2 showing the windshield in closed position;

Figure 4 is a detailed sectional view taken on the line 4—4 of Figure 2;

Figure 5 is a sectional view taken on the line 5—5 of Figure 6;

Figure 6 is a detail sectional view through the bottom of the windshield.

Referring now to the drawings in which like characters of reference designate corresponding parts throughout the several views, the numeral 1 designates a windshield of conventional form that is preferably hinged at its upper edge to a suitable support such as the windshield header 2 at the front of a vehicle body. The reference character 3 indicates the instrument board of the vehicle arranged adjacent to but spaced from the cowl 4 and belt rail 5 in the customary manner. Disposed between the instrument board 3 and the lower edge of the windshield 1 is a bracket 6 arranged to support the operating mechanism for swinging the windshield about its pivots. As shown a portion of one end of this bracket extends through a suitable opening formed in the instrument board and the opposite end is arranged in contacting relation with the belt rail. For rigidly holding the bracket in the above position a supporting member 7 is provided having the opposite ends thereof secured respectively to the bracket and cowl. Extending longitudinally of the bracket and journalled in the upstanding legs 8 and 9 thereof is an operating element 10, preferably in the form of a worm or screw and to one end of which a handle 11 is secured. In order to conceal the portions of the bracket 6 an operating screw protruding through the instrument board and escutcheon plate 12 is provided having laterally projecting ears 13 secured to the instrument board and bracket.

Mounted upon and movable longitudinally of the screw is a suitable nut or carrier 14 having an upwardly extending projection 15 for receiving one end of the windshield actuating arm 16. Journalled upon the opposite end of this arm is a slide 17 arranged to travel in a suitable inverted channel member 18 secured to and extending a suitable distance along the lower edge of the windshield. In this connection it is to be noted that when the windshield is swung to open position the lower edge thereof moves upwardly from the horizontal, consequently some means must be provided to compensate for this upward movement. This result is accomplished in the present invention by inclining the channel member upwardly from one side of the windshield as clearly shown in Figure 6 of the drawings.

In order to accomplish a positive and uniform adjustment of the windshield a lever 19 is provided having one end pivotally mounted upon the arm 16 intermediate the ends thereof and having the opposite end pivotally mounted upon the bracket 6 by means of the fixed pivot 20. To provide an efficient mounting for this pivot and to properly position the lever with respect to the arm the bracket is formed with an open return-bent portion 21 the upper wall 22 of which constitutes a bearing for the lever 19. Disposed between the wall 22 and bracket 6 is a suitable spacer block 23 in which the pivot 20 is journalled.

While gravity will tend to accentuate the closing of the windshield, means for urging the windshield toward its open position is provided in the form of a spring 24. As shown one end 24' of the spring is hooked about the arm 19 in advance of the pivotal connection between the lever 19 and arm 16 while a portion of the spring intermediate the ends thereof is coiled about a member 25 sleeved upon the projection 15 of the carrier. The member 25 not only functions to hold the spring in position but also prevents displacement of the arm 16. In a like manner a member 26 is sleeved upon the upper portion of the fixed pivot 20 for holding the lever 19 in position upon the upper wall 23 of the bracket 6. As shown this member is formed with a circumferential groove 27 adjacent the upper end thereof for receiving the opposite end 28 of the spring. Thus from the foregoing, it will be readily apparent that in the closed position of the windshield the spring 24 will be under tension normally urging the windshield to open position. This action however is prevented due to the fact that the operating mechanism for the windshield is inherently self-locking so that the windshield will remain in any of its adjusted positions and will not be displaced therefrom even by the vibrations and jars of the vehicle in transit. In order to insure a tight connection between the slide 17 and channel guide member 18 to prevent rattling of these parts, a spring 29 is clamped upon the forward edge of the slide and arranged to engage one wall of the channel.

Assuming that the windshield is in the closed position illustrated in the full lines in Figure 1 and it is desired to open the same, the handle 11 and consequently the screw 10 is rotated in a counterclockwise direction moving the carrier, together with the inner end of the arm 16, toward the rear of the vehicle and owing to the particular connection between this arm and the fixed pivot 20 the lower edge of the windshield is forced outwardly. In this connection it will be apparent that the slide 17 secured to the outer end of the arm 16 will move in a substantially straight line in the channel member 18.

For controlling the direction of the air entering the vehicle body a deflector 30 is secured to the lower edge and extends longitudinally of the windshield. As shown, this deflector is formed with an inwardly extending flange 31 which cooperates with the lateral extension 32 of the instrument board 3 to form an air duct. With the foregoing arrangement, when the windshield is closed no ventilation is possible as the air is absolutely excluded by the weather excluding strip 33. However, during the initial steps of adjustment of the windshield, that is, during any of its positions of adjustment between the position shown in full and dotted lines in Figure 1 air will be admitted, which air will pass upwardly and rearwardly to the instrument board 3 and then downwardly between the cowl and instrument board. It will be noted that the rear edge of the deflector lies adjacent the forward edge of the extension 32 of the instrument board so that the air as well as other outer elements will be intercepted from passing upwardly and against the occupants of the vehicle. As long as the deflector is in close proximity with the extension 32 the ventilation will be limited to the air passing under the flange 31 of the instrument board and through the passage formed by the latter and the cowl. However, when the windshield is swung to a position in which the deflector is spaced a considerable distance from the extension 32 air will also pass under the edge of the windshield and rearwardly into the vehicle over the top of the extension 32. However, even in such instances air will also be directed by the extension forwardly and downwardly under the cowl, this desired ventilation thus being also obtained.

While an illustrative embodiment of this invention has been shown and described somewhat in detail, it will be immediately apparent to those skilled in this art that various modifications in which details of construction as well as rearrangements of the parts may be resorted to, as found necessary or desired without departing from the spirit and scope of this invention and to this end reservation is made to make such changes as may come within the purview of the accompanying claims.

What we claim as our invention is:

1. In a windshield construction, a swinging windshield, a bracket rigidly mounted adjacent the lower swinging edge of said windshield, a rotatable operating element journalled in said bracket, a carrier movable by said element, an arm engageable with said windshield and pivotally mounted upon said carrier, and a lever having one end pivoted upon said bracket and the opposite end connected to said arm.

2. In a windshield construction, a swinging windshield, a horizontal actuating arm for said windshield having one end slidably connected to the latter and movable in a plane parallel to the lower edge of the windshield and means connected to the opposite end of said arm for moving the same in a rectilinear path.

3. In a windshield construction, a swingingly mounted windshield, an operating element rotatably mounted adjacent the lower edge of said windshield, a carrier movable by said operating element, an arm carried by said carrier and slidably engaging said windshield for adjusting the latter, and a spring coiled around a portion of said carrier and having an extension hooked around said arm.

4. In combination, a swinging windshield, a rectilinearly movable carrier, an arm having one end slidably engaging said windshield and the opposite end pivotally connected to said carrier and a member pivotally connected to a fixed support and to said arm operable upon movement of said carrier to swing the said arm about the pivotal connection of the latter to the carrier.

5. In a windshield construction, a swinging windshield having a guide member upon the lower edge thereof, actuating means for said windshield including an operating arm having one end slidably engaging said guide member, a rectilinear movable carrier connected to the opposite end of said arm for moving the same in a predetermined path, and a lever pivotally connected to a fixed support and to said arm intermediate the said ends thereof for swinging the arm upon movement of the carrier.

6. In a windshield construction, a swingingly mounted windshield, an operating element rotatably mounted adjacent the lower edge of said windshield, a carrier movable by said operating element, an arm carried by said carrier and connected to said windshield for adjusting the latter, and means associated with said arm for urging the windshield toward its open position.

7. In a windshield construction, a swingingly mounted windshield, actuating means for said windshield including an arm having one end engageable with said windshield, means operable to move the opposite end of said arm in a rectilinear path, and a lever having one end pivotally connected to a fixed support and the opposite end pivotally connected to said arm intermediate the ends thereof to establish a fulcrum therefor.

8. In combination, a fixed support, a windshield movable relative to said support, a carrier movable rectilinearly in a plane at substantially right angles to the windshield, a substantially horizontally disposed arm having one end positioned upon and movable rectilinearly with said carrier and having the opposite end thereof operatively connected and movable in a plane substantially parallel to said windshield, a connection between said arm and fixed support, and means for actuating said carrier.

9. In a windshield construction, a swinging windshield, a bracket rigidly mounted adjacent thereof, and actuating means for said windshield including a horizontally disposed rotatable screw extending at right angles to the windshield and journaled in said bracket, a carrier movable longitudinally of said screws, a connection between said carrier and windshield including a horizontally disposed lever having one end journaled upon and movable with said carrier and having the opposite end thereof movable in a plane parallel and operatively connected to said windshield, and a connection between said lever and bracket.

10. In a windshield construction, a fixed support, a windshield movable relative to said support, a carrier movable in a plane at substantially right angles to said windshield, an arm terminally connected to said windshield and carrier, a connection between said arm and fixed support, an actuating means for said arm including a rotary part engaging said carrier, and a crank fixed to said rotary part.

11. In a windshield construction, a fixed support, a windshield movable relative to said support, and actuating means for said windshield including an arm having one end connected to said windshield and having its other end movable in a rectilinear path over said support, and a lever connected to said arm and support in such a way as to cause the first-mentioned end of said arm to move the windshield relative to the support when the last-mentioned end moves in a rectilinear path over said support.

In testimony whereof we affix our signatures.

WILLIAM MARSHALL.
CURTIS W. BEHNKE.